UNITED STATES PATENT OFFICE.

HARRISON W. FARRELL, OF NOAH, TENNESSEE.

STOMACH-BITTERS.

SPECIFICATION forming part of Letters Patent No. 440,998, dated November 18, 1890.

Application filed September 4, 1890. Serial No. 363,940. (No specimens.)

*To all whom it may concern:*

Be it known that I, HARRISON W. FARRELL, a citizen of the United States of America, residing at Noah, in the county of Coffee and State of Tennessee, have invented certain new and useful Improvements in Medicinal Compounds; and I do hereby declare the following to be a full, clear, and exact description of the invention, such as will enable others skilled in the art to which it appertains to make and use the same.

This invention has reference to medicinal compounds, and relates more especially to a preparation designed for use as stomach-bitters.

In making the improved bitters I preferably take about ninety-seven pounds of maize or cornmeal and scald it to convert it into a stiff dough and permit it to stand until the heat decreases to a degree that its temperature registers a little above blood heat, or substantially so. While in this condition I stir in four pounds of rye-meal, and then sprinkle the mass with three pounds of meal made from sprouted maize or corn, and also add of butternut-bark (*Juglans cinerea*) a quantity of about one pound. I also take of the bark of tulip-tree, (*Liriodendron*,) poplar, (*Populus*,) or quaking aspen (*Populus tremuloides*) about one and a half pounds. To this is added wild or black cherry bark (*Prunus Virginiana*) to the extent of one and a half pound. I then let the whole mass stand in a summer heat from twelve to twenty-four hours, and then reduce by adding as much water as may be found necessary, in order to secure a consistence substantially equal to that of paste. When this stage is reached, I introduce it into a still and boil it until all the medicinal properties are extracted, and this distillate I again subject to distillation until it is further concentrated, at which time the preparation is ready for consumption. It may be used as a tonic and recuperative in doses of a small wine-glassful at or after meals, the doses being reduced for children in proportion to age.

I claim—

The improved stomach-bitters herein described, consisting of a distillate obtained from a mixture of cornmeal, rye-meal, malted or sprouted corn, butternut-bark, poplar, or tulip-tree bark, and wild-cherry bark, taken in the proportions stated.

In testimony whereof I affix my signature in presence of two witnesses.

HARRISON W. FARRELL.

Witnesses:
A. B. WITHERSPOON,
W. L. HAZARD.